United States Patent
Ma et al.

(10) Patent No.: US 12,119,754 B1
(45) Date of Patent: Oct. 15, 2024

(54) ISOLATED DC/DC CONVERTER TOPOLOGY STRUCTURE FOR FUEL CELL SYSTEM

(71) Applicant: Tongji University, Shanghai (CN)

(72) Inventors: Tiancai Ma, Shanghai (CN); Qilin Liu, Shanghai (CN); Daohai Jiao, Shanghai (CN); Weikang Lin, Shanghai (CN); Kaihang Song, Shanghai (CN)

(73) Assignee: Tongji University, Shanghai (CN)

( * ) Notice: Subject to any disclaimer, the term of this patent is extended or adjusted under 35 U.S.C. 154(b) by 0 days.

(21) Appl. No.: 18/677,237

(22) Filed: May 29, 2024

(30) Foreign Application Priority Data

Jun. 1, 2023 (CN) .......................... 202310644557.8

(51) Int. Cl.
*H02M 3/335* (2006.01)
*H02M 1/32* (2007.01)
*H02M 1/36* (2007.01)

(52) U.S. Cl.
CPC ......... *H02M 3/33584* (2013.01); *H02M 1/32* (2013.01); *H02M 1/36* (2013.01); *H02M 3/33573* (2021.05)

(58) Field of Classification Search
CPC ....... H02M 3/333584; H02M 3/33573; H02M 1/32; H02M 1/36
See application file for complete search history.

(56) References Cited

U.S. PATENT DOCUMENTS 7,518,886 B1 * 4/2009 Lai .......................... H02M 1/14
  363/71
2012/0170325 A1 * 7/2012 Jin ...................... H02M 7/4807
  363/21.09

(Continued)

FOREIGN PATENT DOCUMENTS

CN   210536301 U   5/2020
CN   111409508 A   7/2020

(Continued)

OTHER PUBLICATIONS

Claims as Granted by the Chinese Patent Office, 4 pages.

(Continued)

*Primary Examiner* — Rafael O De Leon Domenech
(74) *Attorney, Agent, or Firm* — Thompson Patent Law Offices PC

(57) ABSTRACT

Isolated direct DC/DC converter topology structure for fuel cell system includes: Boost converter topology structure and bidirectional full-bridge converter topology structure connected in sequence. Input of the Boost converter topology structure is connected to fuel cell, and output of the Boost converter topology structure is connected to other key components of the fuel cell system and input of the bidirectional full-bridge converter topology structure. Output of the bidirectional full-bridge converter topology structure is connected to power cell. Usage of the Boost converter topology structure and usage of the bidirectional full-bridge converter topology structure change under different operating states of the fuel cell system. Based on insulation (Continued)

performance and high efficiency of the fuel cell system, the usage of the Boost converter topology structure and the usage of the bidirectional full-bridge converter topology structure change. Low efficiency caused by DC/DC converter with single isolated topology structure is effectively overcome.

6 Claims, 11 Drawing Sheets

(56) References Cited

U.S. PATENT DOCUMENTS

2018/0254732 A1* 9/2018 Smolenaers ............ H02J 1/12
2020/0339103 A1* 10/2020 Takahashi ............ B60L 3/04

FOREIGN PATENT DOCUMENTS

| | | |
|---|---|---|
| CN | 114583948 A | 6/2022 |
| CN | 116683773 A | 9/2023 |

OTHER PUBLICATIONS

First Office Action, issued by the State Intellectual Property Office of People's Republic of China, 7 pages.
Notice To Grant Claims, mailed Jan. 22, 2024 by the State Intellectual Property Office of People's Republic of China, 2 pages.

* cited by examiner

ISOLATED DC/DC CONVERTER TOPOLOGY STRUCTURE FOR FUEL CELL SYSTEM

CROSS REFERENCE TO RELATED APPLICATION

This patent application claims the benefit and priority of Chinese Patent Application No. 202310644557.8 filed with the China National Intellectual Property Administration on Jun. 1, 2023, the disclosure of which is incorporated by reference herein in its entirety as part of the present application.

TECHNICAL FIELD

The present disclosure relates to the technical field of fuel cell systems, and in particular to an isolated direct current/direct current (DC/DC) converter topology structure for a fuel cell system.

BACKGROUND

In the future, the high-power fuel cell system is mainly formed by connecting many 100 KW fuel cell system modules in parallel. Generally, the insulation resistance of the fuel cell system is about 100 kΩ in an operation state. However, in the case of parallel connection of multiple modules, this insulation performance indicators decrease proportionally with the number of modules, so that the insulation performance of the fuel cell system is significantly reduced.

The DC/DC converters are classified into isolated DC/DC converters and non-isolated DC/DC converters. The non-isolated DC/DC converter has a narrow voltage input range without an electrical isolation function, which easily generates the loop current on a ground line to bring poor safety, such that the key components in the system cannot be protected. With continuous improvement of power and continuous extension of an application range for fuel cell system, there are higher requirements for safety, and the above shortcomings of the non-isolated DC/DC converter become more prominent. The usage of transformers provides a better electrical insulation performance of the isolated DC/DC converter. However, the isolated topology structure requires a large number of switching transistors and additional transformer components. Therefore, loss of the isolated DC/DC converter is significantly increased due to the increase in the number of switching transistors and leakage inductance of the transformer. In addition, energy loss of an auxiliary system of a direct current bus that obtains feedback energy is increased. Therefore, high energy loss is produced when the isolated DC/DC converter is applied to an MW fuel cell system.

In addition, a control strategy for the DC/DC converter is usually designed based on a DC/DC converter topology structure. A single topology structure results in a single function implemented by the control strategy. Currently, a control strategy commonly used in a mainstream interleaved Boost DC/DC converter is constant current-constant voltage control. The control strategy cannot meet an energy demand under the multidirectional energy flow of the future fuel cell system with multiple modules connected in parallel.

SUMMARY

To resolve the above problems, the present disclosure provides an isolated direct current/direct current (DC/DC) converter topology structure for a fuel cell system.

To achieve the above objective, the present disclosure provides the following technical solutions.

An isolated DC/DC converter topology structure for a fuel cell system includes: a Boost converter topology structure and a bidirectional full-bridge converter topology structure that are connected in sequence, where an input end of the Boost converter topology structure is connected to a fuel cell, and an output end of the Boost converter topology structure is connected to other key components of the fuel cell system and an input end of the bidirectional full-bridge converter topology structure; the other key components include: an air compressor and a hydrogen circulation pump; an output end of the bidirectional full-bridge converter topology structure is connected to a power cell; and usage of the Boost converter topology structure and usage of the bidirectional full-bridge converter topology structure change under different operating states of the fuel cell system.

Optionally, that the usage of the Boost converter topology structure and the usage of the bidirectional full-bridge converter topology structure change under the different operating states of the fuel cell.

Specifically, during starting, the fuel cell is not powered on, the power cell supplies power to the other key components of the fuel cell system via the bidirectional full-bridge converter topology structure, and in this case, the Boost converter topology structure is not used; and after the fuel cell is started, the fuel cell supplies power to the other key components of the fuel cell system via the Boost converter topology structure, and supplies power to the power cell via the Boost converter topology structure and the bidirectional full-bridge converter topology structure, and in this case, the Boost converter topology structure and the bidirectional full-bridge converter topology structure are used simultaneously.

Optionally, the Boost converter topology structure includes: a power switching transistor $Q_9$, an inductor $L_2$, a filter capacitor $C_{f2}$, and a diode $D_9$, one end of the inductor $L_2$ is connected to a positive electrode of the fuel cell, the other end of the inductor $L_2$ is respectively connected to a drain of the power switching transistor $Q_9$ and an anode of the diode $D_9$, a cathode of the diode $D_9$ is respectively connected to one end of the filter capacitor $C_{f2}$, the input end of the bidirectional full-bridge converter topology structure, and the other key components of the fuel cell system, and the other end of the filter capacitor $C_{r2}$ is connected to a source of the power switching transistor $Q_9$, the input end of the bidirectional full-bridge converter topology structure, and a negative electrode of the fuel cell.

Optionally, the bidirectional full-bridge converter topology structure includes: a left topology structure, an inductor $L_1$, a transformer, a right topology structure, and a filter capacitor $C_{f1}$; an input end of the left topology structure is the input end of the bidirectional full-bridge converter topology structure, and an output end of the right topology structure is the output end of the bidirectional full-bridge converter topology structure; and the input end of the left topology structure is respectively connected to the cathode of the diode $D_9$ and the other end of the filter capacitor $C_{f2}$, an output end of the left topology structure is connected to one end of the inductor $L_1$ and the other end of a primary coil of the transformer, and the other end of the inductor $L_1$ is connected to one end of the primary coil of the transformer; a secondary coil of the transformer is connected to an input end of the right topology structure; the filter capacitor $C_{f1}$ is parallelly connected to the input end of the right topology structure; and the power cell is parallelly connected to two sides of the filter capacitor $C_{f1}$.

Optionally, the left topology structure includes: a power switching transistor $Q_1$, a power switching transistor $Q_2$, a power switching transistor $Q_3$, a power switching transistor $Q_4$, a diode $D_1$, a diode $D_2$, a diode $D_3$, and a diode $D_4$; and a drain of the power switching transistor $Q_1$ is respectively connected to the cathode of the diode $D_9$, the one end of the filter capacitor $C_{f2}$, a cathode of the diode $D_1$, a drain of the power switching transistor $Q_3$, and a cathode of the diode $D_3$; a source of the power switching transistor $Q_1$ is respectively connected to an anode of the diode $D_1$, the one end of the inductor $L_1$, a drain of the power switching transistor $Q_2$, and the cathode of the diode $D_2$; a source of the power switching transistor $Q_2$ is respectively connected to the other end of the filter capacitor $C_{f2}$, an anode of the diode $D_3$, a source of the power switching transistor $Q_4$, and an anode of the diode $D_4$; a source of the power switching transistor $Q_3$ is respectively connected to an anode of the diode $D_3$, a drain of the power switching transistor $Q_4$, a cathode of the diode $D_4$, and the other end of the primary coil of the transformer; and the other end of the inductor $L_1$ is connected to the one end of the primary coil of the transformer.

Optionally, the right topology structure includes: a power switching transistor $Q_5$, a power switching transistor $Q_6$, a power switching transistor $Q_7$, a power switching transistor $Q_8$, a diode $D_5$, a diode $D_6$, a diode $D_7$, a diode $D_8$, an inductor $L_1$, a filter capacitor $C_{f1}$, and the transformer; and a drain of the power switching transistor $Q_5$ is respectively connected to a cathode of the diode $D_5$, a drain of the power switching transistor $Q_7$, a cathode of the diode $D_7$, one end of the filter capacitor $C_{f1}$, and a positive electrode of the power cell; a source of the power switching transistor $Q_5$ is respectively connected to one end of the secondary coil of the transformer, an anode of the diode $D_5$, a drain of the power switching transistor $Q_6$, and a cathode of the diode $D_6$; a source of the power switching transistor $Q_6$ is respectively connected to an anode of the diode $D_6$, a source of the power switching transistor $Q_8$, an anode of the diode $D_8$, the other end of the filter capacitor $C_{f1}$, and a negative electrode of the power cell; a source of the power switching transistor $Q_7$ is respectively connected to an anode of the diode $D_7$, a drain of the power switching transistor $Q_8$, a cathode of the diode $D_8$, and the other end of the secondary coil of the transformer; and the other end of the inductor $L_1$ is connected to the one end of the primary coil of the transformer.

Optionally, a voltage sensor is disposed on a side of the filter capacitor $C_{f2}$; and a current sensor is disposed on a side of the inductor $L_2$.

Optionally, temperature sensors are disposed at the power switching transistor $Q_1$, the power switching transistor $Q_2$, the power switching transistor $Q_3$, the power switching transistor $Q_4$, the power switching transistor $Q_5$, the power switching transistor $Q_6$, the power switching transistor $Q_7$, the power switching transistor $Q_8$, and the power switching transistor $Q_9$.

Optionally, the isolated DC/DC converter topology structure for the fuel cell system is capable of preventing a voltage of a bus from surging quickly, specifically:

when the fuel cell system is integrally started, the fuel cell is not powered on, the power cell is required to supply power to the other key components of the fuel cell system, a pulse width modulation (PWM) duty cycle incremental method is adopted to start the fuel cell system, and the power switching transistor $Q_5$, the power switching transistor $Q_6$, the power switching transistor $Q_7$, and the power switching transistor $Q_8$ are started preferentially;

during starting, a voltage change rate and a voltage value of a voltage $V_{dc}$ collected by the voltage sensor are monitored, when the voltage change rate of $V_{dc}$ exceeds a preset threshold, an increase rate of a duty cycle is reduced, and to prevent over-voltage of $V_{dc}$, a voltage $V_{dc}$ limiting protection algorithm is also set, until $V_{dc}$ reaches a preset voltage; and after $V_{dc}$ is stabilized and the fuel cell operates normally, the Boost converter topology structure is introduced to the fuel cell, to generate electricity, and the power switching transistor $Q_1$, the power switching transistor $Q_2$, the power switching transistor $Q_3$, and the power switching transistor $Q_4$ are started while the power switching transistor $Q_9$ is started.

Optionally, the isolated DC/DC converter topology structure for the fuel cell system is capable of setting an energy transfer direction based on an energy flow requirement, specifically:

when the fuel cell system is started, the power cell supplies power to the other key components of the fuel cell system, and energy of the bidirectional full-bridge converter topology structure flows from the right topology structure to the left topology structure; and after the fuel cell system operates normally, the fuel cell supplies power to the other key components of the fuel cell system, and in this case, the energy of the bidirectional full-bridge converter topology structure flows from the left topology structure to the right topology structure.

According to specific embodiments provided in the present disclosure, the present disclosure has the following technical effects:

According to the isolated DC/DC topology structure for the fuel cell system provided in the present disclosure, by taking into account insulation performance and high efficiency required by the fuel cell system, a three-directional energy flow can be achieved for the fuel cell system among the fuel cell, the power cell, and other key components of the fuel cell system. Furthermore, the usage of the Boost converter topology structure and the usage of the bidirectional full-bridge converter topology structure change according to different operating states of the fuel cell system. This effectively overcomes low efficiency caused by the DC/DC converter with a single isolated topology structure.

BRIEF DESCRIPTION OF THE DRAWINGS

To describe the technical solutions in embodiments of the present disclosure or in the prior art more clearly, the accompanying drawings required in the embodiments are briefly described below. Apparently, the accompanying drawings in the following description show merely some embodiments of the present disclosure, and other drawings can be derived from these accompanying drawings by those of ordinary skill in the art without creative efforts.

DETAILED DESCRIPTION OF THE EMBODIMENTS

The technical solutions of the embodiments of the present disclosure are clearly and completely described below with reference to the drawings in the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

An objective of the present disclosure is to provide an isolated DC/DC converter topology structure for a high-power fuel cell system that takes into account insulation performance and high efficiency.

In order to make the above objective, features, and advantages of the present disclosure clearer and more comprehensible, the present disclosure will be further described in detail below in combination with accompanying drawings and particular embodiments.

The isolated direct current/direct current (DC/DC) converter topology structure for the fuel cell system according to the present disclosure includes: a Boost converter topology structure and a bidirectional full-bridge converter topology structure connected in sequence. An input end of the Boost converter topology structure is connected to a fuel cell, and an output end of the Boost converter topology structure is connected to other key components of the fuel cell system and an input end of the bidirectional full-bridge converter topology structure. The other key components include: an air compressor and a hydrogen circulation pump. An output end of the bidirectional full-bridge converter topology structure is connected to a power cell. Usage of the Boost converter topology structure and usage of the bidirectional full-bridge converter topology structure change under different operating states of the fuel cell system.

Figure 1:
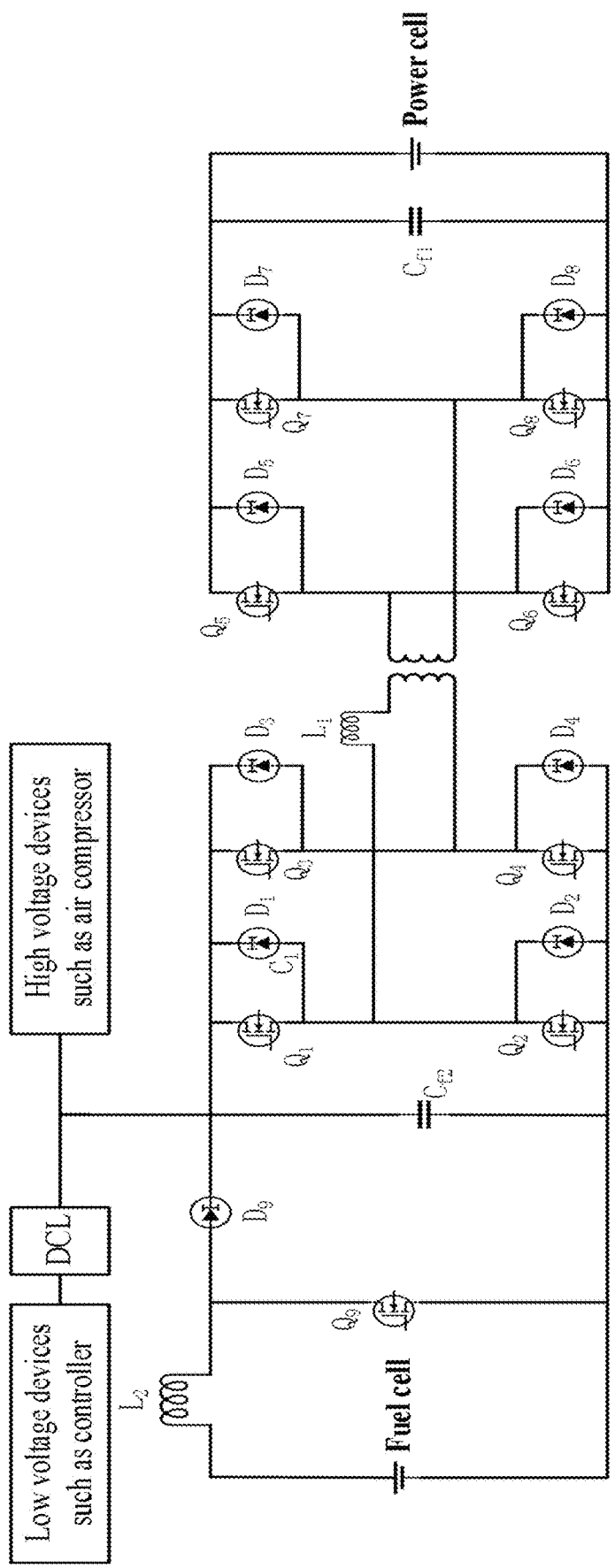
FIG. 1 is a circuit diagram of an isolated DC/DC converter topology structure for a fuel cell system according to the present disclosure.

Further, as shown in FIG. 1, the Boost converter topology structure includes: a power switching transistor $Q_9$, an inductor $L_2$, a filter capacitor $C_{f2}$, and a diode $D_9$. One end of the inductor $L_2$ is connected to a positive electrode of the fuel cell, the other end of the inductor $L_2$ is respectively connected to a drain of the power switching transistor $Q_9$ and an anode of the diode $D_9$, a cathode of the diode $D_9$ is respectively connected to one end of the filter capacitor $C_{f2}$, the input end of the bidirectional full-bridge converter topology structure, and the other key components of the fuel cell system, and the other end of the filter capacitor $C_{f2}$ is connected to a source of the power switching transistor $Q_9$, the input end of the bidirectional full-bridge converter topology structure, and a negative electrode of the fuel cell.

Further, as shown in FIG. 1, the bidirectional full-bridge converter topology structure includes: a left topology structure, an inductor $L_1$, a transformer, a right topology structure, and a filter capacitor $C_{f1}$. An input end of the left topology structure is the input end of the bidirectional full-bridge converter topology structure, and an output end of the right topology structure is the output end of the bidirectional full-bridge converter topology structure.

The input end of the left topology structure is respectively connected to the cathode of the diode $D_9$ and the other end of the filter capacitor $C_{f2}$, an output end of the left topology structure is connected to one end of the inductor $L_1$ and the other end of a primary coil of the transformer, and the other end of the inductor $L_1$ is connected to one end of the primary coil of the transformer. A secondary coil of the transformer is connected to an input end of the right topology structure. The filter capacitor $C_{f1}$ is parallelly connected to the input end of the right topology structure. The power cell is parallelly connected to two sides of the filter capacitor $C_{f1}$.

Further, as shown in FIG. 1, the left topology structure includes: a power switching transistor $Q_1$, a power switching transistor $Q_2$, a power switching transistor $Q_3$, a power switching transistor $Q_4$, a diode $D_1$, a diode $D_2$, a diode $D_3$, and a diode $D_4$.

A drain of the power switching transistor $Q_1$ is respectively connected to the cathode of the diode $D_9$, the one end of the filter capacitor $C_{f2}$, a cathode of the diode $D_1$, a drain of the power switching transistor $Q_3$, and a cathode of the diode $D_3$; a source of the power switching transistor $Q_1$ is respectively connected to an anode of the diode $D_1$, the one end of the inductor $L_1$, a drain of the power switching transistor $Q_2$, and the cathode of the diode $D_2$; a source of the power switching transistor $Q_2$ is respectively connected to the other end of the filter capacitor $C_{f2}$, an anode of the diode $D_3$, a source of the power switching transistor $Q_4$, and an anode of the diode $D_4$; a source of the power switching transistor $Q_3$ is respectively connected to an anode of the diode $D_3$, a drain of the power switching transistor $Q_4$, a cathode of the diode $D_4$, and the other end of the primary coil of the transformer; and the other end of the inductor $L_1$ is connected to the one end of the primary coil of the transformer.

Further, as shown in FIG. 1, the right topology structure includes: a power switching transistor $Q_5$, a power switching transistor $Q_6$, a power switching transistor $Q_7$, a power switching transistor $Q_8$, a diode $D_5$, a diode $D_6$, a diode $D_7$, a diode $D_8$, an inductor $L_1$, a filter capacitor $C_{f1}$, and the transformer.

A drain of the power switching transistor $Q_5$ is respectively connected to a cathode of the diode $D_5$, a drain of the power switching transistor $Q_7$, a cathode of the diode $D_7$, one end of the filter capacitor $C_{f1}$, and a positive electrode of the power cell; a source of the power switching transistor $Q_5$ is respectively connected to one end of the secondary coil of the transformer, an anode of the diode $D_5$, a drain of the power switching transistor $Q_6$, and a cathode of the diode $D_6$; a source of the power switching transistor $Q_6$ is respectively connected to an anode of the diode $D_6$, a source of the power switching transistor $Q_8$, an anode of the diode $D_8$, the other end of the filter capacitor $C_{f1}$, and a negative electrode of the power cell; a source of the power switching transistor $Q_7$ is respectively connected to an anode of the diode $D_7$, a drain of the power switching transistor $Q_8$, a cathode of the diode $D_8$, and the other end of the secondary coil of the transformer; and the other end of the inductor $L_1$ is connected to the one end of the primary coil of the transformer.

Further, a voltage sensor is disposed on a side of the filter capacitor $C_{f2}$, and a detected voltage signal is defined as $V_{dc}$. A current sensor is disposed on a side of the inductor $L_2$. Temperature sensors are disposed at power switching transistors $Q_1$ to $Q_9$. The power switching transistors $Q_1$ to $Q_9$ are SiC Mosfet power switching transistors.

Steps and formulas for post-processing an analog-to-digital converter (ADC) data acquired by individual sensors are as follows:

Recording of ADC calibration values: After a device is initially started, values of an ADC module result register of a digital signal processor (DSP) chip within 0.4 s are recorded for sensor signal calibration.

$$value = \frac{\sum_{i=1}^{20} ADC.RESULT}{20}$$

where ADC.RESULT represents a register value of the result register after the ADC performs sampling once.

A processing formula of the current sensor is as follows:

$$I=(Averg_I-value_I)*K_I$$

where I represents an actual current, $K_I$ represents a current correction coefficient, $Averg_I$ represents an ADC sampling average value corresponding to the current sensor within 20 ms, and $value_I$ represents a starting calibration value of the current sensor.

A processing formula of the voltage sensor is as follows:

$$V=(Averg_V-value_V)*K_V$$

where V represents an actual voltage, $K_V$ represents a voltage correction coefficient, $Averg_V$ represents an ADC sampling average value corresponding to the voltage sensor within 20 ms, and $value_V$ represents a starting calibration value of the voltage sensor.

A processing formula of the temperature sensor is as follows:

$$R_t = \frac{1875000}{K_T * Averg_T}$$

where $R_t$ represents a current resistance value of a negative temperature coefficient (NTC) thermistor, $K_T$ represents a correction coefficient of the NTC thermistor, $Averg_T$ represents an ADC sampling average value corresponding to the current sensor within 20 ms.

$$T = \frac{1}{\frac{\ln(R_t/R)}{B} + \frac{1}{T_2}}$$

T represents an actual sampling temperature, $R_t$ represents the resistance value of the thermistor at sampling, R represents an NTC thermistor with a nominal resistance value of 5,000Ω, $T_2$ represents a corresponding temperature 298K at 5,000Ω of the NTC thermistor, and a B value represents a B value of a 5 k thermistor, and takes 3,950 in this case.

In specific embodiments, parameters of electrical devices are as follows:

TABLE 1

| Parameters of electrical devices | |
| --- | --- |
| Device | Parameter |
| Inductor $L_1$ | Inductance 0.015 mH |
| Inductor $L_2$ | Inductance 0.08 mH |

TABLE 1-continued

| Parameters of electrical devices | |
| --- | --- |
| Device | Parameter |
| Capacitor $Cf_1$ | Capacitance 120 μF |
| Capacitor $Cf_2$ | Capacitance 240 μF |
| Power cell | Output range 650 V-800 V |
| Fuel cell | Output range 420 V-520 V |
| $Q_1$-$Q_9$ | Switching frequency 50 kHz |

The isolated DC/DC converter topology structure for the fuel cell system according to the present disclosure has two usage manners as follows.

Figure 2:
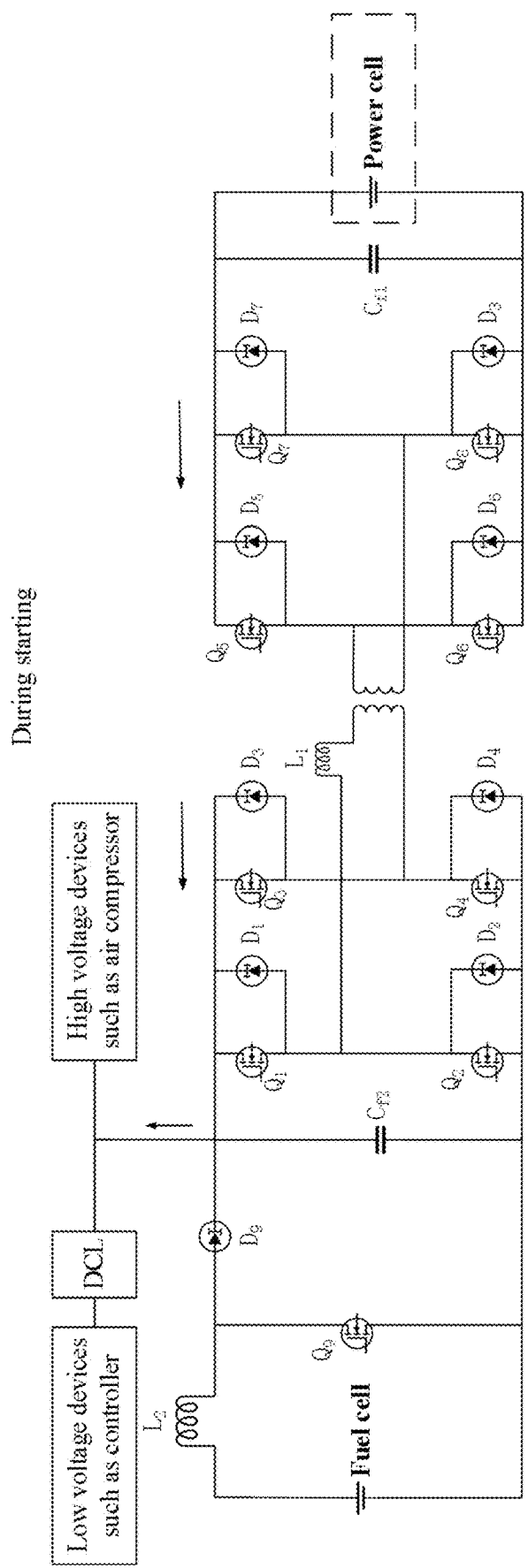
FIG. 2 is a schematic diagram of usage of the isolated DC/DC converter topology structure for the fuel cell system during starting.

As shown in FIG. 2, during starting, the fuel cell is not powered on, the power cell supplies power to the other key components of the fuel cell system, such as the air compressor and the hydrogen circulation pump, via the bidirectional full-bridge converter topology structure, and in this case, the Boost converter topology structure is not used.

Figure 3:
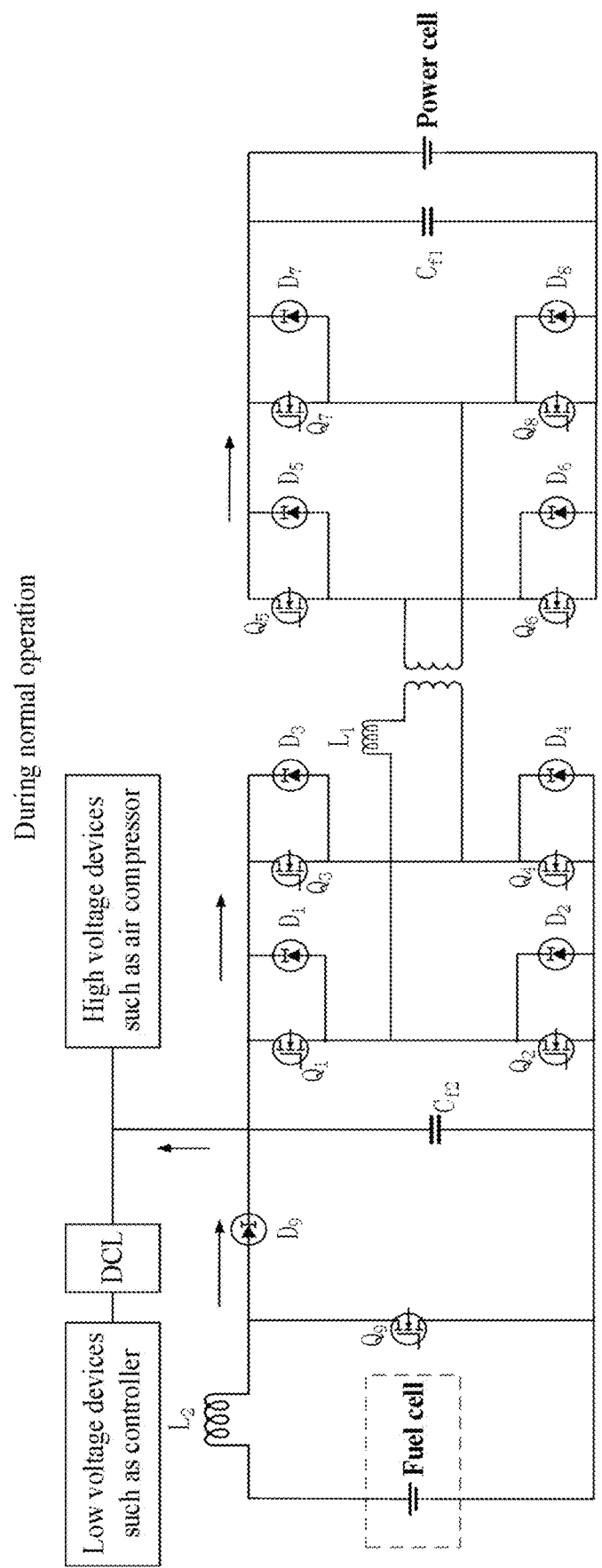
FIG. 3 is a schematic diagram of usage of the isolated DC/DC converter topology structure for the fuel cell system after a fuel cell is started.

As shown in FIG. 3, after the fuel cell is started, the fuel cell supplies power to the other key components of the fuel cell system, such as the air compressor and the hydrogen circulation pump, via the Boost converter topology structure, and supplies power to the power cell via the Boost converter topology structure and the bidirectional full-bridge converter topology structure, and in this case, the Boost converter topology structure and the bidirectional full-bridge converter topology structure are used simultaneously.

Software implementing functions of the isolated DC/DC converter topology structure for the fuel cell system according to the present disclosure has the following functions: a soft starting function for preventing a voltage of a bus from surging quickly, a function of setting the energy transfer direction based on the energy flow requirement, a self-adjustment function that varies with a change in load during normal operation of the device, and a fault diagnosis function.

Figure 4:
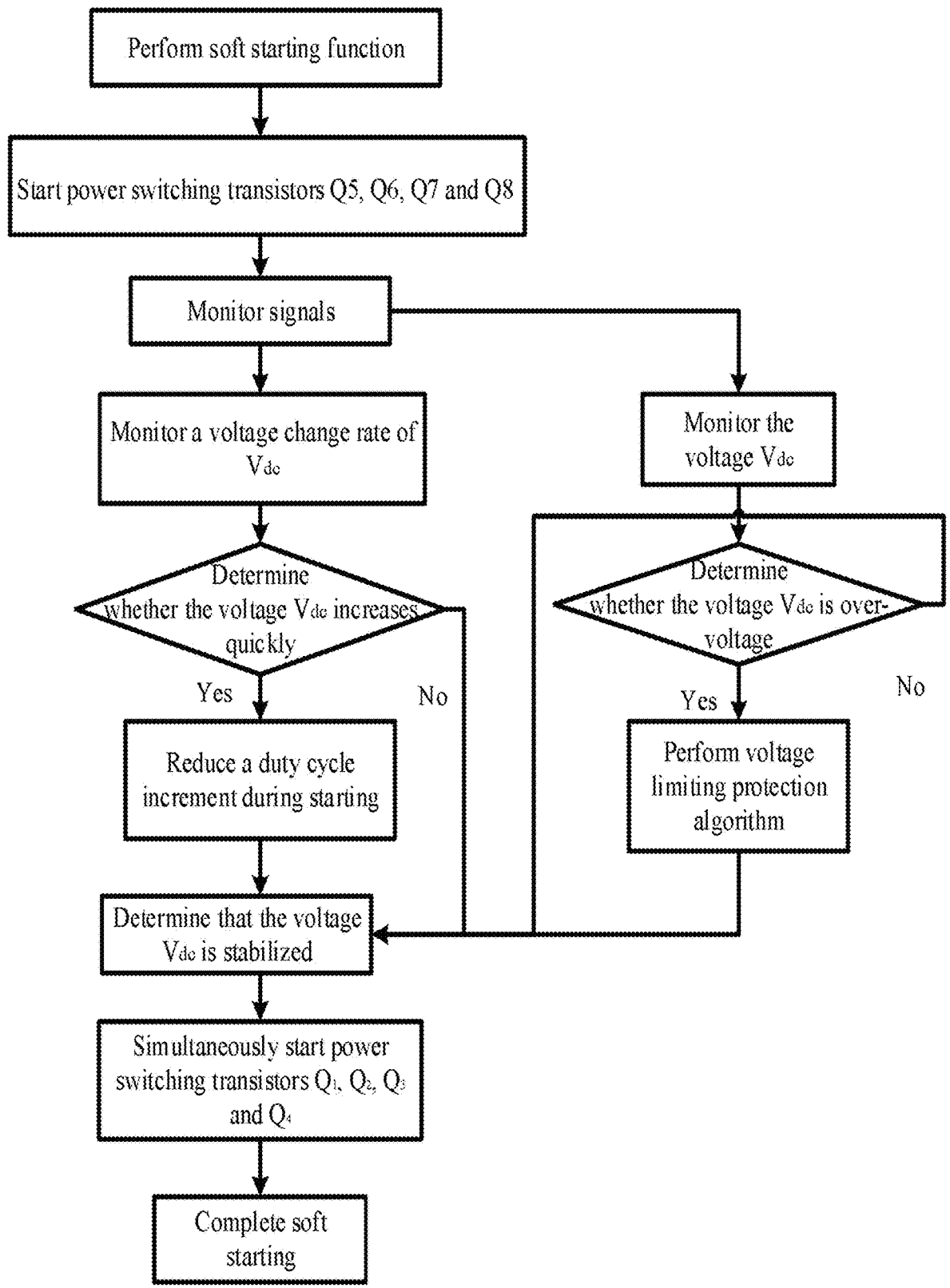
FIG. 4 is a flowchart of soft starting of the isolated DC/DC converter topology structure for the fuel cell system.

Further, FIG. 4 is a flowchart of soft starting of the isolated DC/DC converter topology structure for the fuel cell system according to the present disclosure. As shown in FIG. 4, specific steps of the soft starting function for preventing the voltage of the bus from surging quickly of the software implementing functions of the isolated DC/DC converter topology structure of the fuel cell system include the following steps S11-S12.

S11: When the fuel cell system is integrally started, the fuel cell is not powered on, the power cell is required to supply power to other key components of the fuel cell system. A pulse width modulation (PWM) duty cycle incremental method is adopted to perform the soft starting, and four power switching transistors $Q_5$, $Q_6$, $Q_7$, and $Q_8$ on a right side of the bidirectional full-bridge converter are started preferentially.

S12: During starting, a voltage change rate and a voltage value of a voltage $V_{dc}$ are monitored, when the voltage change rate of $V_{dc}$ changes quickly, an increase rate of a duty cycle is reduced properly, and to prevent over-voltage of $V_{dc}$, a voltage limiting protection algorithm of $V_{dc}$ is also set, until $V_{dc}$ reaches a preset voltage.

S13: After $V_{dc}$ is stabilized and the fuel cell operates normally, the Boost converter topology structure is introduced to the fuel cell, to generate electricity, and power switching transistors $Q_1$, $Q_2$, $Q_3$, and $Q_4$ are started while the power switching transistor $Q_9$ in the Boost converter topology structure is started.

Figure 5:
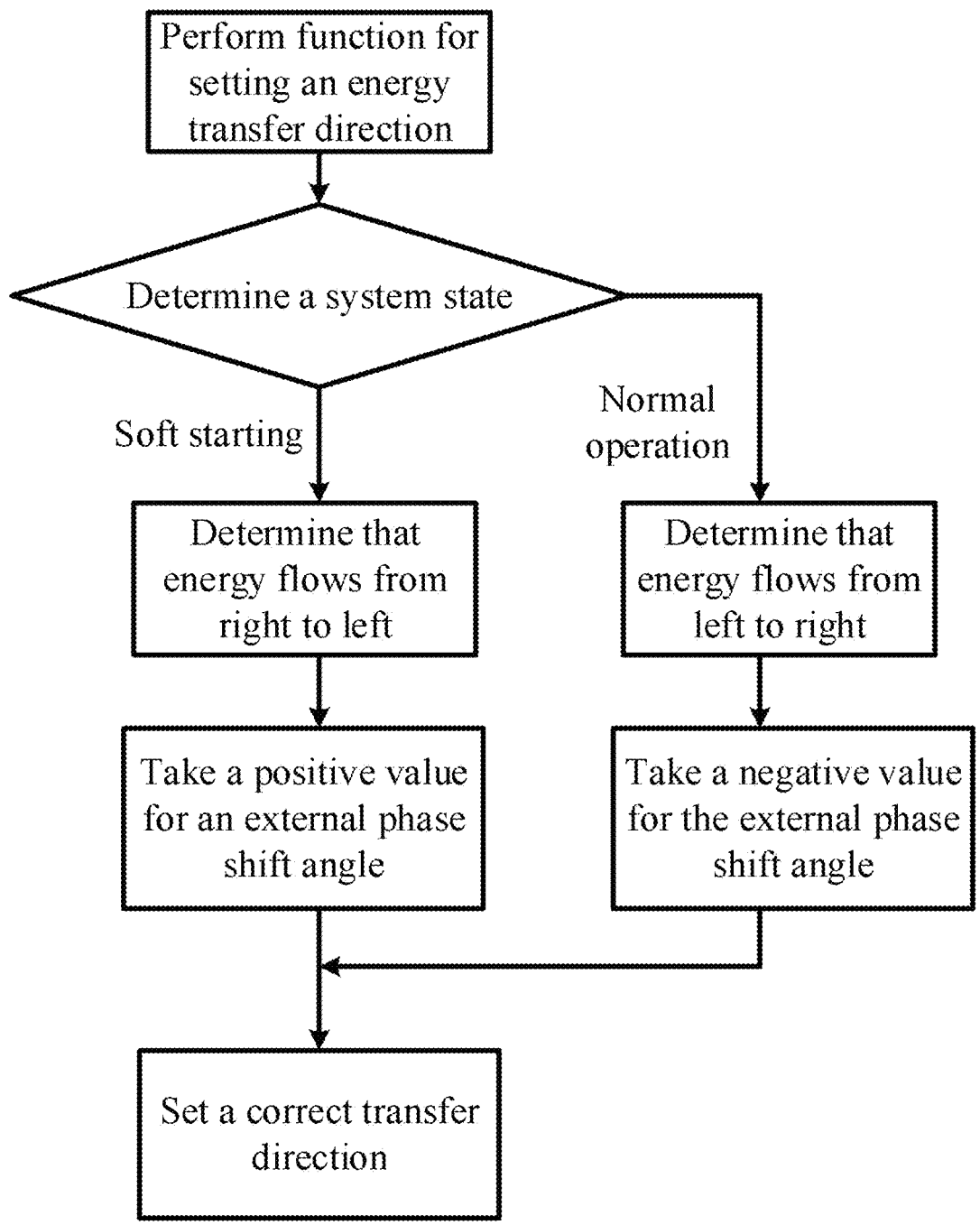
FIG. 5 is a flowchart of a function for setting an energy transfer direction based on an energy flow requirement.

Further, FIG. 5 is a flowchart of a function for setting an energy transfer direction based on an energy flow requirement. As shown in FIG. 5, specific steps are as follows:

S21: When the fuel cell system is started, the power cell is required to supply power to the other key components of the fuel cell system. Energy of the bidirectional full-bridge converter topology structure flows from the right topology structure to the left topology structure. A specific implementation is to enable a phase of a power switching transistor of the right topology structure to be advancing to a phase of a power switching transistor of the left topology structure. A advancing phase angle φ is defined as an external phase shift angle. In addition, transferred power of the bidirectional full-bridge converter topology structure is calculated according to the following calculation formula:

$$P_{trans} = \frac{k(NV_2)^2 D_\Phi (1 - D_\Phi)}{2Lf_s}$$

where $k=V_1/NV_2$, N represents a winding ratio of a primary coil to a secondary coil of a full-bridge converter, $V_1$ represents a primary voltage of the full-bridge converter, $V_2$ represents a secondary voltage of the full-bridge converter, L represents inductance of the full-bridge converter, $f_s$ represents a switching frequency of the full-bridge converter, and $D_\varphi$ represents a ratio of the phase shift angle φ to π, i. e., a phase shift duty cycle.

S22: After the fuel cell operates normally, the fuel cell supplies power to the other key components of the fuel cell system. In this case, the energy of the bidirectional full-bridge converter topology structure flows from the left topology structure to the right topology structure. A specific implementation is to enable the phase of the power switching transistor of the left topology structure to be advancing to the phase of the power switching transistor of the right topology structure. In addition, the transferred power of the bidirectional full-bridge converter topology structure is calculated according to the foregoing calculation formula.

Figure 6:
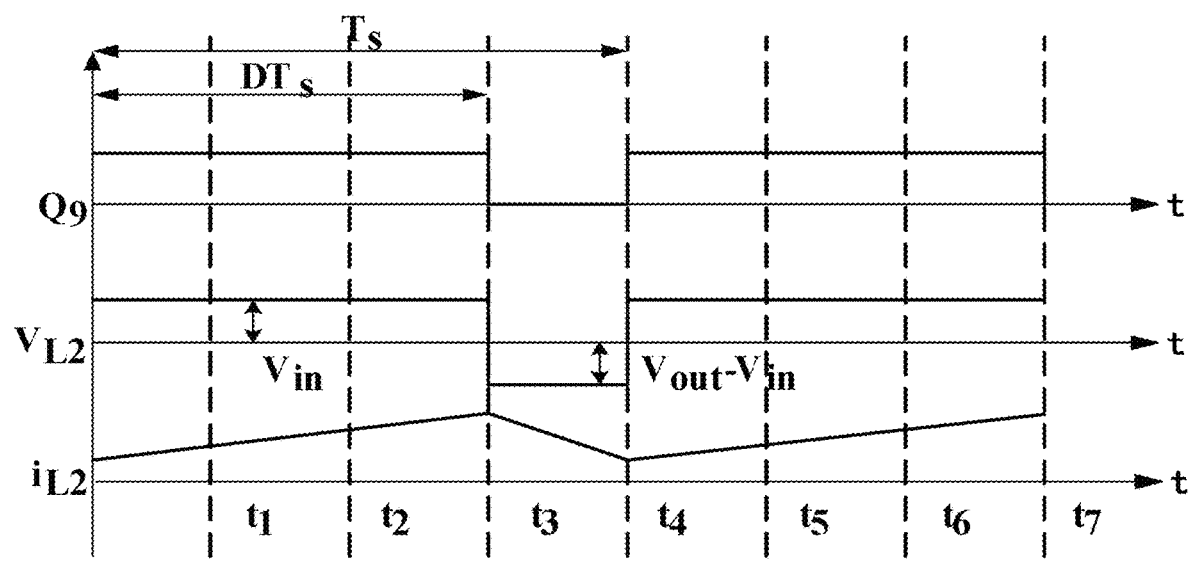
FIG. 6 is a principle schematic diagram of a Boost topology structure.

FIG. 6 is a principle schematic diagram of the Boost converter topology structure, where $Q_9$ corresponds to $Q_9$ in FIG. 1, an inductor $L_2$ corresponds to the inductor $L_2$ in FIG. 1, $V_{in}$ represents an input voltage of the Boost structure, $V_{out}$ represents an output voltage of the Boost structure, and a driving waveform of $Q_9$ is shown in FIG. 6. When a duty cycle D and a switching cycle $T_s$ are given, at $0$-$DT_s$, the power switching transistor $Q_9$ is switched on. In this case, a voltage across the inductor $L_2$ is equal to the input voltage $V_{in}$, a current of the inductor $L_2$ rises, and the inductor $L_2$ accumulates energy. At $DT_s$-$T_s$, the power switching transistor $Q_9$ is switched off. In this case, the voltage across the inductor $L_2$ is a difference between the output voltage $V_{out}$ and the input voltage $V_{in}$, the current of the inductor $L_2$ declines, and the inductor $L_2$ provides continuous current. A calculation formula for a current change rate and voltage of the inductor $L_2$ is as follows:

$$\frac{di_{L2}}{dt} = \frac{V_{L2}}{L_2}$$

where $L_2$ represents the inductance of the inductor $L_2$, $V_{12}$ represents the voltage of the inductor $L_2$, and $$\frac{di_{L2}}{dt}$$

represents the current change rate of the inductor $L_2$.

Figure 7A:
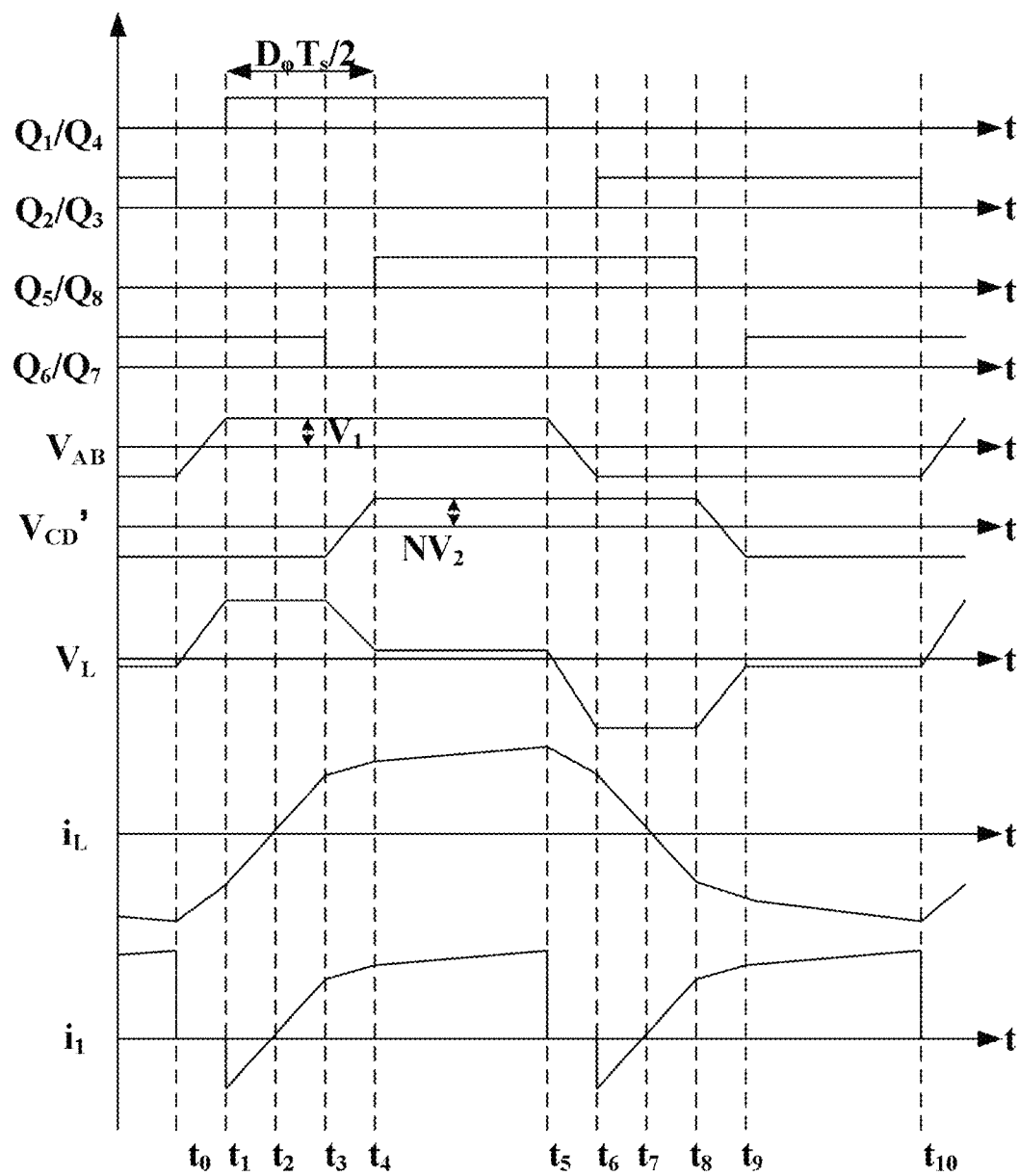
FIGS. 7A and 7B are principle schematic diagrams of a bidirectional full-bridge converter topology structure.
Figure 7B:
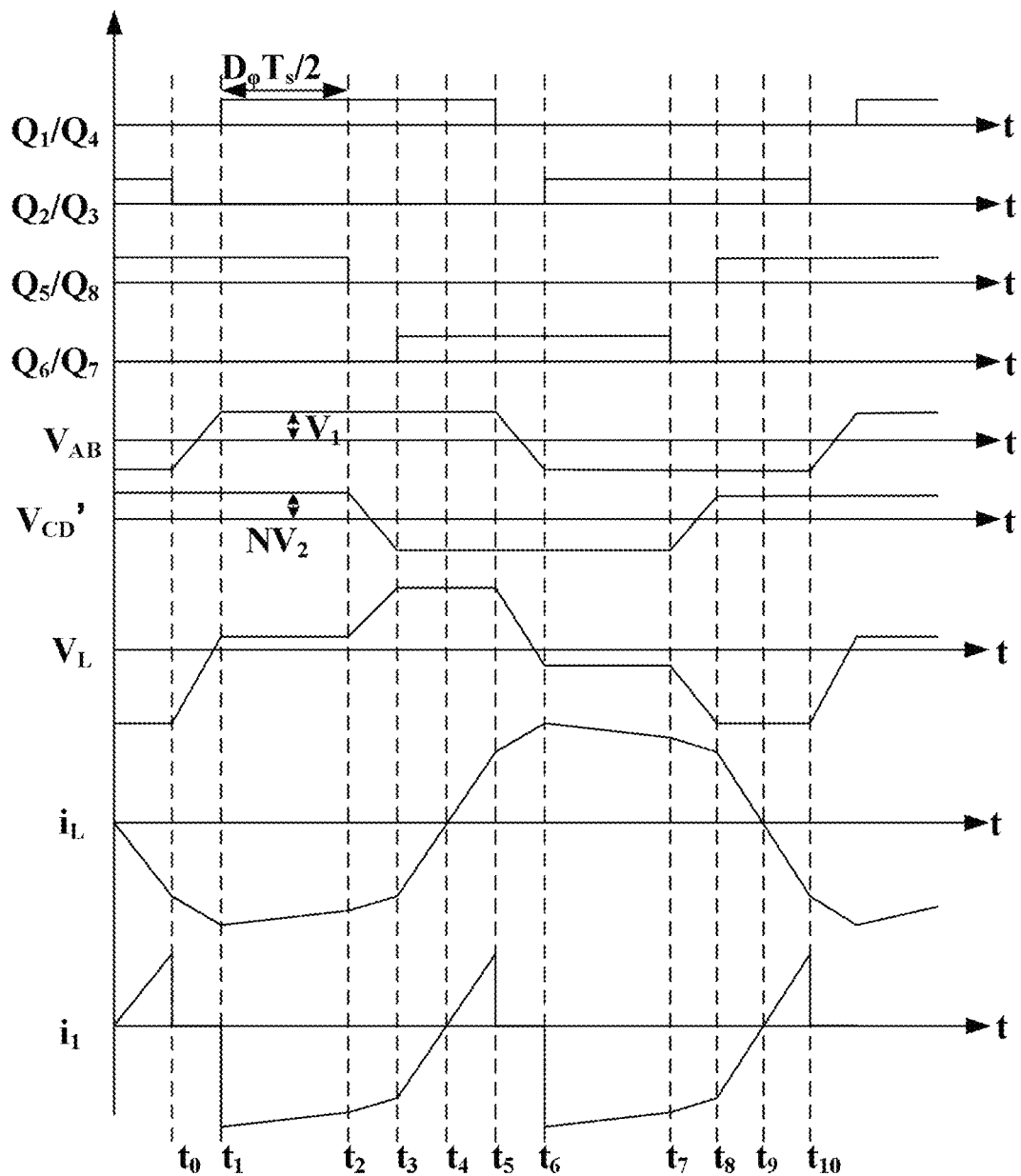

FIGS. 7A and 7B are principle schematic diagrams of the bidirectional full-bridge converter topology structure, where $Q_1$ to $Q_8$ correspond to $Q_1$ to $Q_8$ in FIG. 1 respectively, an inductor L corresponds to the inductor $L_1$ in FIG. 1, a driving waveform of $Q_1$ is consistent with a driving waveform of $Q_4$, a driving waveform of $Q_2$ is consistent with a driving waveform of $Q_3$, a driving waveform of $Q_5$ is consistent with a driving waveform of $Q_8$, a driving waveform of $Q_6$ is consistent with a driving waveform of $Q_7$, there are dead times between a driving signal of $Q_1$ and $Q_4$ and a driving signal of $Q_2$ and $Q_3$, and between a driving signal of $Q_5$ and $Q_8$ and a driving signal of $Q_6$ and $Q_7$, and the phase shift time $t_{phase}$ is:

$$t_{phase} = D_\Phi T_s/2$$

where $T_s$ represents the switching cycle, and $D_\Phi$ represents the phase shift duty cycle.

In FIG. 7A, a driving signal of a power switching transistor at a half-bridge on a $Q_1$ side is ahead of a driving signal of a power switching transistor at a half-bridge on a $Q_5$ side by $D_\Phi T_s/2$. In FIG. 7B, the driving signal of the power switching transistor at the half-bridge on the $Q_1$ side falls behind the driving signal of the power switching transistor at the half-bridge on the $Q_5$ side by $D_\Phi T_s/2$. $V_{AB}$ represents a voltage between a connection node of $Q_1$ and $Q_2$ and a connection node of $Q_3$ and $Q_4$ at the half-bridge on the $Q_1$ side, and a value $V_1$ of $V_{AB}$ represents a voltage across $C_{r2}$ in FIG. 1. $V_{CD'}$ represents a voltage obtained after a voltage between a connection node of $Q_5$ and $Q_6$ and a connection node of $Q_7$ and $Q_8$ at the half-bridge on the $Q_5$ side is equivalent to the $Q_1$ side through a transformer, where $V_2$ represents a voltage across $C_{f1}$ in FIG. 1, and N represents a winding ratio of a coil of a transformer on the $Q_1$ side to a coil of a transformer on the $Q_5$ side. $V_L$ represents a voltage waveform of the inductor $L_1$ on the full-bridge side in FIG. 1, $i_L$ represents a current waveform of the inductor $L_1$ on the full-bridge side in FIGS. 1, and $i_1$ represents a current injected into the half-bridge on the $Q_1$ side. When the half-bridge is in an off state, no loop is formed in the half-bridge, and a value of the current is 0. When the half-bridge is in an on state, the current is consistent with the inductor current. Calculation formulas for the inductor voltage and the current change rate of the inductor $L_1$ are as follows:

$$V_{L1} = V_{AB} - V'_{CD}$$
$$\frac{di_{L1}}{dt} = \frac{V_{L1}}{L_1}$$

where $$\frac{di_{L1}}{dt}$$

represents the current change rate of the inductor $L_1$.

Figure 8:
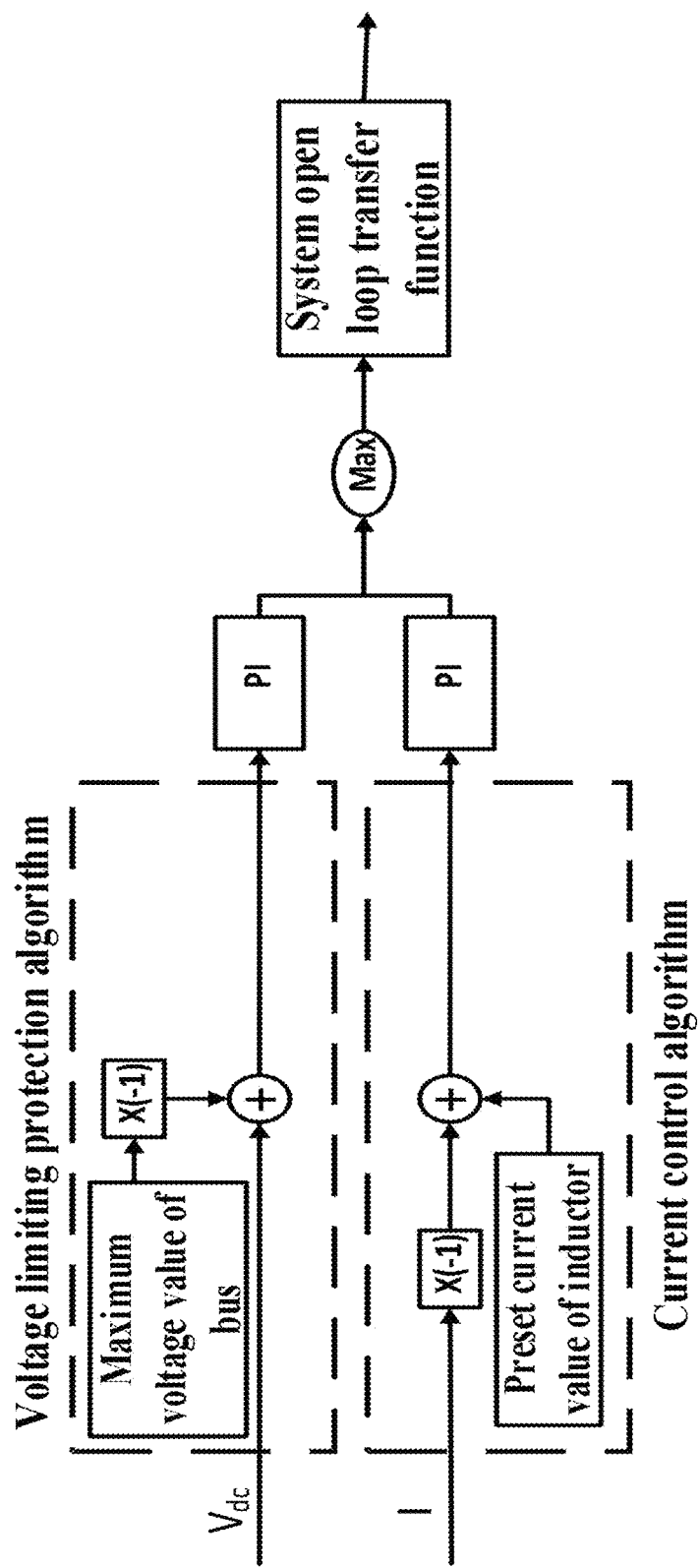
FIG. 8 is an algorithmic architecture diagram of the Boost converter topology structure.

Further, when a device of the function implementation software of the isolated DC/DC converter topology structure according to the present disclosure operates normally, the self-adjustment function that varies with a load has the following two conditions based on different control objects:

The first condition is specific to the Boost converter topology structure. The Boost converter topology structure needs to control a current injected by the fuel cell based on a controller demand. In addition, a voltage limiting protection algorithm is set, to prevent components, such as the air compressor, from burning out due to over-voltage of $V_{dc}$. An observation object of the voltage limiting protection algorithm is the current of the inductor $L_2$ and the voltage value of $V_{dc}$, and a control object is the duty cycle of the power switching transistor $Q_9$. FIG. 8 is an algorithmic architecture diagram of the Boost converter topology structure.

Figure 9:
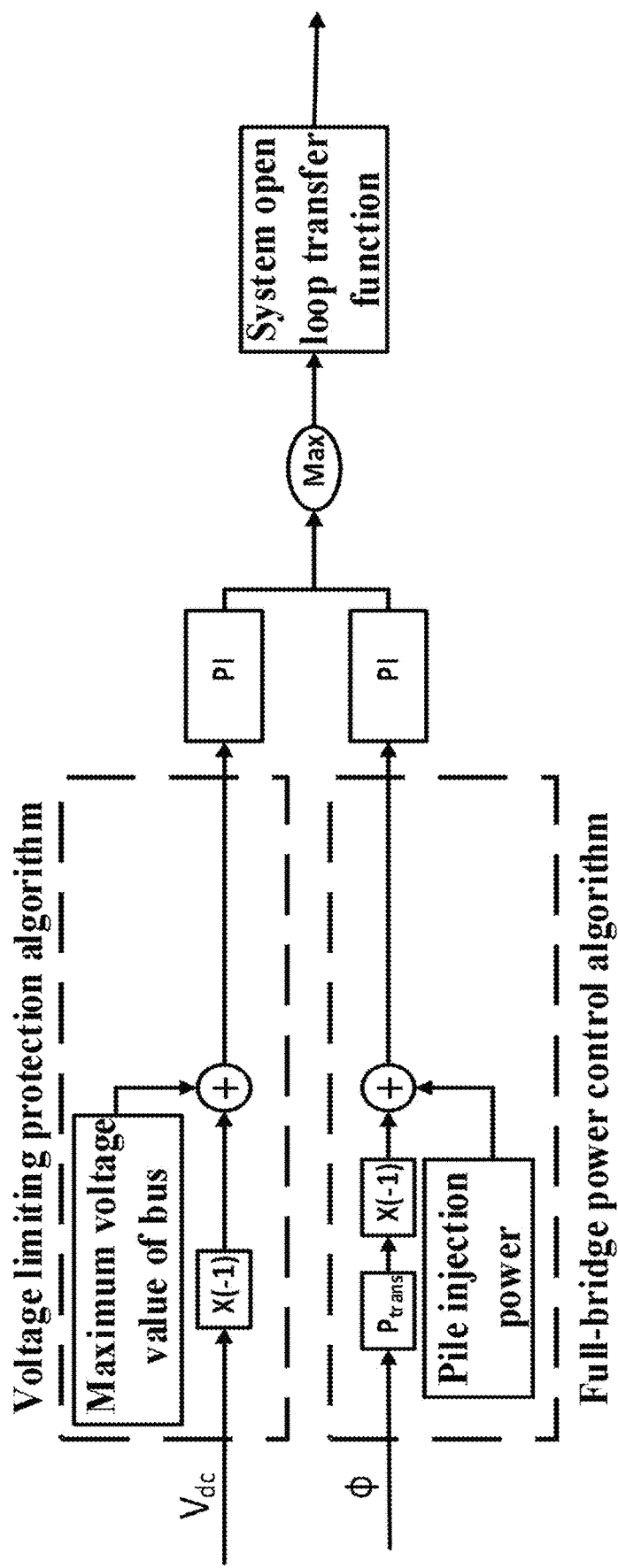
FIG. 9 is an algorithmic architecture diagram of the bidirectional full-bridge converter topology structure.

A second condition is specific to the bidirectional full-bridge converter topology structure. The transferred power of the bidirectional full-bridge converter topology structure, and the voltage value of $V_{dc}$ are related to a value of the external phase shift angle, thereby preventing large injection power on the fuel cell side which can cause energy not to be effectively transferred to the power cell side, resulting in over-voltage of the bus and burning out of components such as the air compressor. An observation object of this algorithm is the voltage of $V_{dc}$ and the power $P_{trans}$ transferred by the bidirectional full-bridge converter topology structure, and a control object is the external phase shift angle of the bidirectional full-bridge converter topology structure. FIG. 9 is an algorithmic architecture diagram of the bidirectional full-bridge converter topology structure.

A discretized formula for pi algorithms in FIG. 8 and FIG. 9 is as follows:

$$\Delta u(k)=K_p(e(k)-e(k-1))+K_i e(k)$$

where $K_p$ represents a p parameter, $K_i$ represents an i parameter, e(k) represents a difference of a current sampling, and e(k−1) represents a difference of a last sampling.

Figure 10:
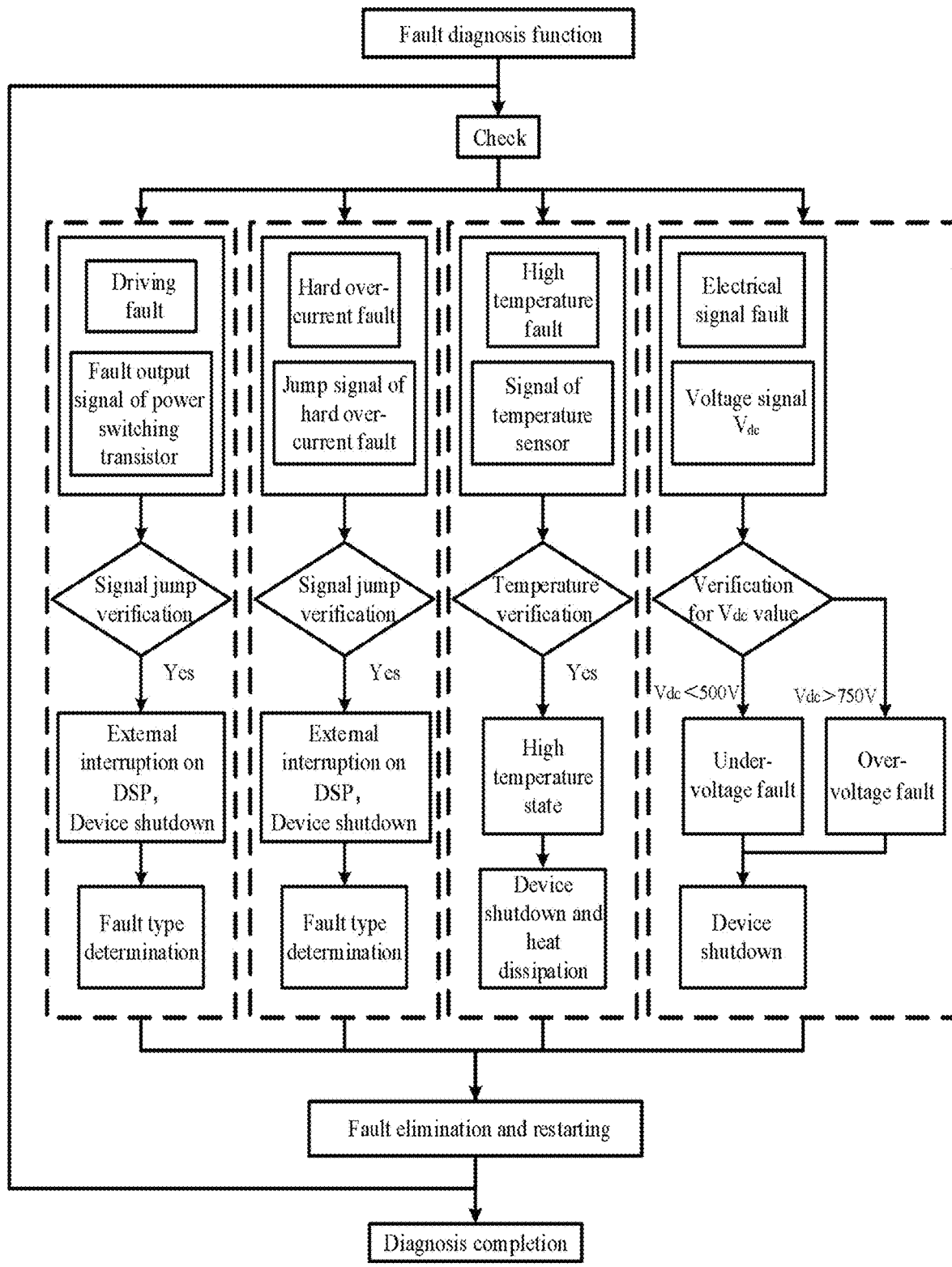
FIG. 10 is a flowchart of classification for fault diagnosis functions according to the present disclosure.

Further, FIG. 10 is a flowchart of classification for fault diagnosis functions. As shown in FIG. 10, the fault diagnosis functions of the function implementation software of the isolated DC/DC converter topology structure according to the present disclosure are specifically classified as follows:

When the DC/DC converter malfunctions, a fault self-check function is available to prevent a safety accident. The fault self-check function includes but is not limited to: a hard over-current fault caused by an excessive inductor current, a driving fault for detecting a power switching transistor fault, a high temperature fault for an abnormal temperature of the power components, an abnormal fault of an electrical signal that needs to be specially focused on, and so on.

A monitoring object of the driving fault is a fault output signal of the power switching transistor. When a fault output interface of the power switching transistor undergoes a jump, a comparator in a peripheral hardware circuit transfers the jump of this signal to a DSP chip, to trigger an external interruption on the DSP chip, and further trigger the drive fault. In this case, automatic shutdown is performed to defect which drive fault occurs in the power switching transistor, and perform restarting after the drive fault is eliminated.

A monitoring object of the hard over-current fault is a jump signal of a hard over-current fault at the inductor $L_2$. When a current signal I is greater than a maximum current value pre-configured for the peripheral hardware circuit, a level jump is generated by a comparator in the peripheral hardware circuit. In addition, the jump of this signal is transferred to the DSP chip by the peripheral hardware circuit, to trigger the external interruption on the DSP chip, and further trigger the hard over-current fault. In this case, automatic shutdown is performed to detect which component may result in the hard over-current fault, and perform restarting after the hard over-current fault is eliminated.

A monitoring object of the high temperature fault is signals of the temperature sensors disposed at power components. When the DSP chip completes processing on the signals of the temperature sensors, it is determined which temperature state each power component is in through comparison with a preset multi-interval threshold. When a high temperature state is achieved, high temperature information needs to be fed back in time, and if necessary, automatic shutdown is performed to prevent the power switching transistor from exploding due to high temperature.

A monitoring object of the abnormal fault of the electrical signal specially focused on is a voltage signal $V_{dc}$ detected by the voltage sensor disposed at the filter capacitor $C_{f2}$. A voltage operating range of high voltage components such as the air compressor and the hydrogen circulation pump in this embodiment is usually 500V to 750V. When $V_{dc}$<500V, under-voltage occurs. When $V_{dc}$>750 v, the high voltage component is burnt out. Therefore, it is necessary to focus on the voltage signal $V_{dc}$, the under-voltage fault needs to be fed back in time at a low voltage, and an alarm needs to be provided when approaching a high voltage limit.

Compared with the conventional technologies, the present disclosure has the following beneficial effects:

(1) Insulation performance of the converter is integrally improved, and it can effectively overcome the disadvantage for poor insulation performance of the DC/DC converter with a non-isolated topology structure.

(2) Overall efficiency of the converter is improved through the control method of the DC/DC converter topology structure. This can effectively overcome the disadvantage for low effective caused by the DC/DC converter with a single isolated topology structure.

(3) Selectable characteristics of the DC/DC converter topology structure can select an implemented topology structure suitable for this state based on different operating states of the fuel cell system. Therefore, control strategies for the DC/DC converter of the fuel cell are enriched, and can deal with an energy demand under the background that the multi-directional energy flow of the fuel cell system flows in the future.

Each embodiment in the description is described in a progressive mode, each embodiment focuses on differences from other embodiments, and the same and similar parts among embodiments can be referred to each other.

Particular examples are used herein for illustration of principles and implementations of the present disclosure. The descriptions of the above embodiments are merely used for assisting in understanding the method and core ideas of the present disclosure. In addition, those of ordinary skill in the art can make various modifications in terms of particular implementations and the application scope in accordance with the ideas of the present disclosure. In conclusion, the content of the description shall not be construed as limitations to the present disclosure.

What is claimed is:

1. An isolated direct current/direct current (DC/DC) converter for a fuel cell system, comprising:
   a Boost converter topology structure and a bidirectional full-bridge converter topology structure connected in sequence, wherein an input end of the Boost converter topology structure is connected to a fuel cell, and an output end of the Boost converter topology structure is connected to other key components of the fuel cell system and an input end of the bidirectional full-bridge converter topology structure; the other key components comprise:
   an air compressor and a hydrogen circulation pump; an output end of the bidirectional full-bridge converter topology structure is connected to a power cell; and usage of the Boost converter topology structure and usage of the bidirectional full-bridge converter topology structure change under different operating states of the fuel cell system;

the Boost converter topology structure comprises: a power switching transistor $Q_9$, an inductor $L_2$, a filter capacitor $C_{f2}$, and a diode $D_9$, one end of the inductor $L_2$ is connected to a positive electrode of the fuel cell, an other end of the inductor $L_2$ is respectively connected to a drain of the power switching transistor $Q_9$ and an anode of the diode $D_9$, a cathode of the diode $D_9$ is respectively connected to one end of the filter capacitor $C_{f2}$, the input end of the bidirectional full-bridge converter topology structure, and the other key components of the fuel cell system, and an other end of the filter capacitor $C_{f2}$ is connected to a source of the power switching transistor $Q_9$, the input end of the bidirectional full-bridge converter topology structure, and a negative electrode of the fuel cell;

the bidirectional full-bridge converter topology structure comprises: a left topology structure, an inductor $L_1$, a transformer, a right topology structure, and a filter capacitor $C_{f1}$; an input end of the left topology structure is the input end of the bidirectional full-bridge converter topology structure, and an output end of the right topology structure is the output end of the bidirectional full-bridge converter topology structure;

the input end of the left topology structure is respectively connected to the cathode of the diode $D_9$ and the other end of the filter capacitor $C_{f2}$, an output end of the left topology structure is connected to one end of the inductor $L_1$ and an other end of a primary coil of the transformer, and an other end of the inductor $L_1$ is connected to one end of the primary coil of the transformer; a secondary coil of the transformer is connected to an input end of the right topology structure; the filter capacitor $C_{f1}$ is parallelly connected to the input end of the right topology structure; and the power cell is parallelly connected to two sides of the filter capacitor $C_{f1}$;

the isolated DC/DC converter for the fuel cell system prevents a voltage of a bus from surging quickly:

wherein, when the fuel cell system is integrally started, the fuel cell is not powered on, the power cell is required to supply power to the other key components of the fuel cell system, a pulse width modulation (PWM) duty cycle incremental method is adopted to start the fuel cell system, and a power switching transistor $Q_5$, a power switching transistor $Q_6$, a power switching transistor $Q_7$, and a power switching transistor $Q_8$ on the right topology structure are started preferentially;

during starting, a voltage change rate and a voltage value of voltage $V_{dc}$ collected by a voltage sensor are monitored; when the voltage change rate of $V_{dc}$ exceeds a preset threshold, an increase rate of a duty cycle is reduced, and to prevent over-voltage of $V_{dc}$, a voltage $V_{dc}$ limiting protection algorithm is also set, until $V_{dc}$ reaches a preset voltage; and after $V_{ac}$ is stabilized and the fuel cell operates normally, the Boost converter topology structure is introduced to the fuel cell, to generate electricity, and a power switching transistor $Q_1$, a power switching transistor $Q_2$, a power switching transistor $Q_3$, and a power switching transistor $Q_4$ in the left topology structure are started while the power switching transistor $Q_9$ is started; and the isolated DC/DC converter for the fuel cell system sets an energy transfer direction based on an energy flow requirement, wherein, when the fuel cell system is started, the power cell supplies power to the other key components of the fuel cell system, and energy of the bidirectional full-bridge converter topology structure flows from the right topology structure to the left topology structure; and after the fuel cell system operates normally, the fuel cell supplies power to the other key components of the fuel cell system, and the energy of the bidirectional full-bridge converter topology structure flows from the left topology structure to the right topology structure.

2. The isolated DC/DC converter for the fuel cell system according to claim 1, wherein that the usage of the Boost converter topology structure and the usage of the bidirectional full-bridge converter topology structure change under the different operating states of the fuel cell, wherein, during starting the fuel cell, the fuel cell is not powered on, the power cell supplies power to the other key components of the fuel cell system via the bidirectional full-bridge converter topology structure, and the Boost converter topology structure is not used; and after the fuel cell is started, the fuel cell supplies power to the other key components of the fuel cell system via the Boost converter topology structure, and supplies power to the power cell via the Boost converter topology structure and the bidirectional full-bridge converter topology structure, and the Boost converter topology structure and the bidirectional full-bridge converter topology structure are used simultaneously.

3. The isolated DC/DC converter for the fuel cell system according to claim 1, wherein the left topology structure comprises: the power switching transistor $Q_1$, the power switching transistor $Q_2$, the power switching transistor $Q_3$, the power switching transistor $Q_4$, a diode $D_1$, a diode $D_2$, a diode $D_3$, and a diode $D_4$; and a drain of the power switching transistor $Q_1$ is respectively connected to the cathode of the diode $D_9$, the one end of the filter capacitor $C_{f2}$, a cathode of the diode $D_1$, a drain of the power switching transistor $Q_3$, and a cathode of the diode $D_3$; and a source of the power switching transistor $Q_1$ is respectively connected to an anode of the diode $D_1$, the one end of the inductor $L_1$, a drain of the power switching transistor $Q_2$, and the cathode of the diode $D_2$; a source of the power switching transistor $Q_2$ is respectively connected to the other end of the filter capacitor $C_{f2}$, an anode of the diode $D_2$, a source of the power switching transistor $Q_4$, and an anode of the diode $D_4$; a source of the power switching transistor $Q_3$ is respectively connected to an anode of the diode $D_3$, a drain of the power switching transistor $Q_4$, a cathode of the diode $D_4$, and the other end of the primary coil of the transformer; and the other end of the inductor $L_1$ is connected to the one end of the primary coil of the transformer.

4. The isolated DC/DC converter for the fuel cell system according to claim 1, wherein the right topology structure comprises: the power switching transistor $Q_5$, the power switching transistor $Q_6$, the power switching transistor $Q_7$, the power switching transistor $Q_8$, a diode $D_5$, a diode $D_6$, a diode $D_7$, a diode $D_8$, the inductor $L_1$, the filter capacitor $C_{f1}$, and the transformer; and a drain of the power switching transistor $Q_5$ is respectively connected to a cathode of the diode $D_5$, a drain of the power switching transistor $Q_7$, a cathode of the diode $D_7$, one end of the filter capacitor $C_{f1}$, and a positive electrode of the power cell; a source of the power switching transistor $Q_5$ is respectively connected to one end of the secondary coil of the transformer, an anode of the diode $D_5$, a drain of the power switching transistor $Q_6$, and a cathode of the diode $D_6$; a source of the power switching transistor $Q_6$ is respectively connected to an anode of the diode $D_6$, a source of the power switching transistor $Q_8$, an anode of the diode $D_8$, the other end of the filter capacitor $C_{f1}$, and a negative electrode of the power cell; a source of the power switching transistor $Q_7$ is respectively connected to an anode of the diode $D_7$, a drain of the power switching transistor $Q_8$, a cathode of the diode $D_8$, and the other end of the secondary coil of the transformer; and the other end of the inductor $L_1$ is connected to the one end of the primary coil of the transformer.

5. The isolated DC/DC converter for the fuel cell system according to claim 4, wherein the voltage sensor is disposed on a side of the filter capacitor $C_{f2}$; and a current sensor is disposed on a side of the inductor $L_2$.

6. The isolated DC/DC structure for the fuel cell system according to claim 5, wherein temperature sensors are disposed at the power switching transistor $Q_1$, the power switching transistor $Q_2$, the power switching transistor $Q_3$, the power switching transistor $Q_4$, the power switching transistor $Q_5$, the power switching transistor $Q_6$, the power switching transistor $Q_7$, the power switching transistor $Q_8$, and the power switching transistor $Q_9$.

\* \* \* \* \*